(12) United States Patent
Matsunaga et al.

(10) Patent No.: US 7,162,345 B2
(45) Date of Patent: Jan. 9, 2007

(54) VEHICLE ACCIDENT ANALYZING APPARATUS

(75) Inventors: Takanori Matsunaga, Tokyo (JP);
Marcus Hiemer, Karlsruhe (DE); Joerg Barrho, Karlsruhe (DE)

(73) Assignee: Mitsubishi Denki Kabushiki Kaishia, Tokyo (JP)

( * ) Notice: Subject to any disclaimer, the term of this patent is extended or adjusted under 35 U.S.C. 154(b) by 158 days.

(21) Appl. No.: 11/046,710

(22) Filed: Feb. 1, 2005

(65) Prior Publication Data
US 2006/0100762 A1    May 11, 2006

(30) Foreign Application Priority Data
Nov. 5, 2004    (JP)    .............................. 2004-322283

(51) Int. Cl.
G06F 19/00    (2006.01)
B60R 22/00    (2006.01)
(52) U.S. Cl. ........................................... 701/45; 70/46
(58) Field of Classification Search .................... None
See application file for complete search history.

(56) References Cited

U.S. PATENT DOCUMENTS 6,167,335 A * 12/2000 Ide et al. ....................... 701/45
6,741,168 B1 * 5/2004 Webb et al. .................. 340/436

FOREIGN PATENT DOCUMENTS

| DE | 197 51 336 A1 | 6/1998 |
| DE | 198 48 997 A1 | 4/1999 |
| DE | 199 25 265 A1 | 12/1999 |
| DE | 199 36 819 A1 | 9/2000 |
| DE | 101 10 168 C1 | 8/2002 |
| JP | 11-348697 A | 12/1999 |

* cited by examiner

Primary Examiner—Michael J. Zanelli
(74) Attorney, Agent, or Firm—Sughrue Mion, PLLC (57) ABSTRACT

To provide a vehicle accident analyzing apparatus in which reconstruction quality of low speed crashes is improved. An impact parameter determination apparatus 10 is provided with a triggering unit 20 which uses input signals from in-vehicle sensors, and an area determination unit 30, and a parameter calculation unit 50. The triggering unit 20 generates a trigger signal 21 based on the input signals for triggering the area determination unit 30 and the parameter calculation unit 50. The area determination unit 30 uses the input signals to calculate the most probable impact area 31. The parameter calculation unit 50 calculates the final desired crash parameters based on the input signals and the most probable impact area 31.

6 Claims, 7 Drawing Sheets

VEHICLE ACCIDENT ANALYZING APPARATUS

BACKGROUND OF THE INVENTION

1. Field of the Invention

The present invention generally relates to a vehicle accident analyzing apparatus including a vehicle parameter determination apparatus operated in conjunction with an accident reconstruction system. In particular, the present invention relates to a technique for improving reconstruction quality of low speed crashes.

2. Description of the Related Art

In general, for a vehicle accident analyzing apparatus, reconstruction of vehicle crashes is one of the most important issues in road traffic accident reconstruction.

Low speed crashes represent an important crash group, as for example injuries of the cervical spine very often occur even at low speeds. The economic costs caused by such injuries are enormous. Therefore, a growing interest for reconstructing such accidents exists in order to answer the question of liability properly.

For example, in a conventional vehicle accident analyzing apparatus, upon reporting an accident, the extent of injuries of the passengers is determined, to thereby achieve speedy reporting to a rescue organization (for example, see Patent Document 1: JP 2001-514789 A).

In the conventional vehicle accident analyzing apparatus, no effective parameter determination units are provided. Therefore, it is not possible to accurately reconstruct the basic passenger motion inside the passenger cab.

SUMMARY OF THE INVENTION

The present invention has been made to solve the problems described above, and an object of the present invention is therefore to provide a vehicle accident analyzing apparatus in which the basic passenger motion inside the passenger cab is accurately reconstructed by determining the impact angle based on the principle direction of force applied to the point of collision (impact location) with a crash opponent at the time of a vehicle crash.

A vehicle accident analyzing apparatus according to the present invention is a vehicle accident analyzing apparatus provided with a crash parameter determination apparatus for determining crash parameters of a vehicle based on input signals from sensors mounted in the vehicle, the crash parameter determination apparatus including: a triggering unit for generating a trigger signal if the input signals indicate a crash situation of the vehicle; an area determination unit for generating the most probable impact area of the vehicle based on the input signals in response to the trigger signal; and a parameter calculation unit for calculating the crash parameters based on the input signals and the most probable impact area, the triggering unit including: a level determination unit for determining levels of the input signals with predefined thresholds; a timer operated in response to a determination result of the level determination unit; a time determination unit for comparing operating time of the timer with predetermined duration time; and logical operators for generating the trigger signal by combining respective determination results of the level determination unit and the time determination unit, wherein the trigger signal enables processes of the area determination unit and the parameter calculation unit to be started; the area determination unit includes an area classification and assignment unit and an area counter triggered by the trigger signal; the area classification and assignment unit determines the most probable impact location of the vehicle to classify the impact area in every time instant; the area counter detects the most probable impact area by individually counting the impact area which has been classified in every time instant by the area classification and assignment unit; and the parameter calculation unit calculates an impact location of the vehicle and an impact force of a crash opponent, and calculates an impact angle based on a principle direction of the impact force applied to the impact location.

According to the present invention, as data from in-vehicle sensors, it is possible to provide valuable information to be assessed at low velocities, such as out-of-position deployment of airbags, and provide more information about such accident situations which often occur and which cause significant human and financial damages. Further, by determining crash parameters (impact location, impact force, and impact angle) regarding a low speed crash, and by determining an event and duration time of a crash in the triggering unit, it is possible to reconstruct the basic passenger motion inside the passenger cab.

DESCRIPTION OF THE PREFERRED EMBODIMENTS

Embodiment 1

Figure 1:
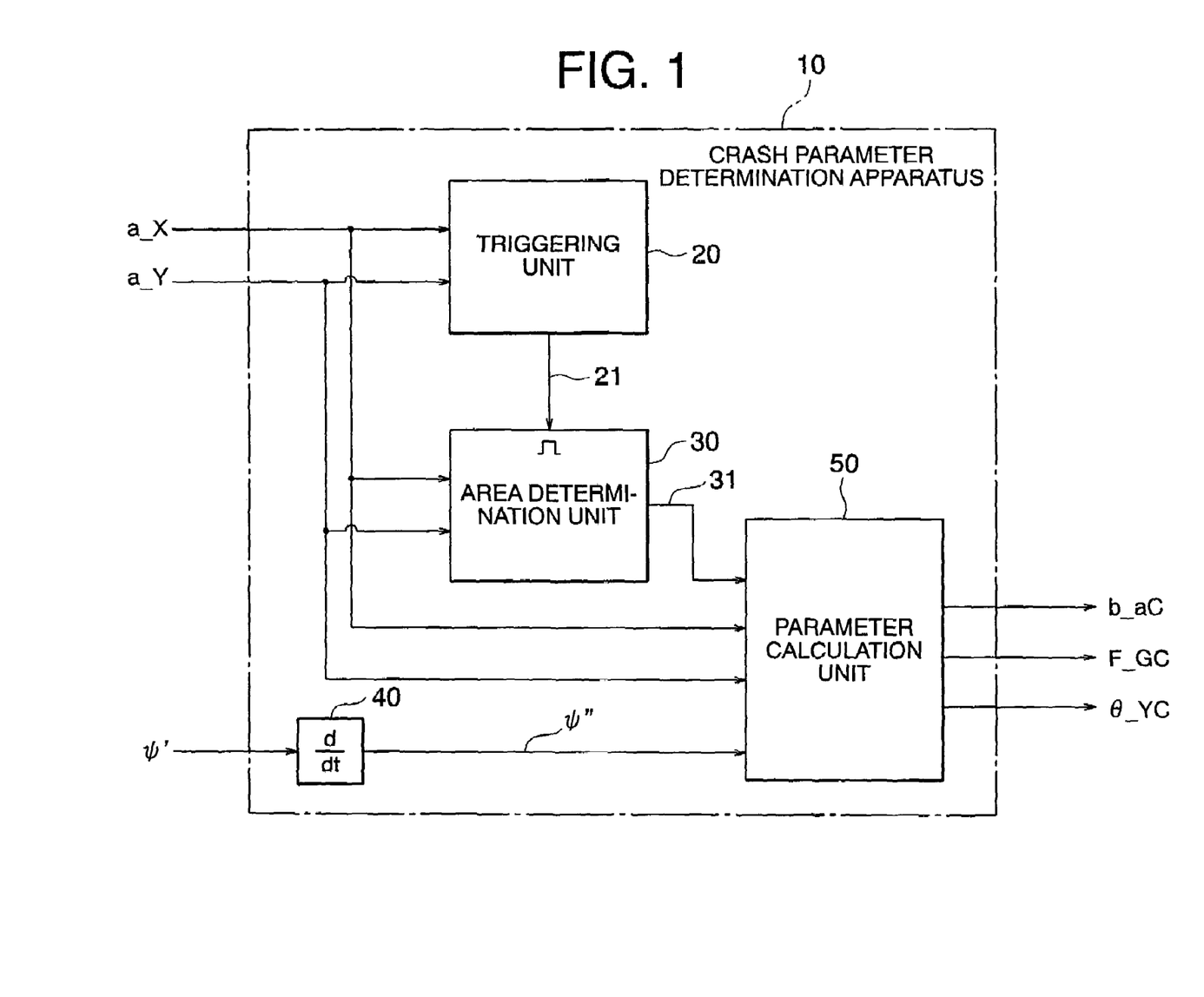
FIG. 1 a block diagram showing a crash parameter determination apparatus which is applied to a vehicle accident analyzing apparatus according to an embodiment 1 of the present invention.

FIG. 1 is a block diagram of a crash parameter determination apparatus which is applied to a vehicle accident analyzing apparatus according to a embodiment 1 of the present invention.

Figure 2:
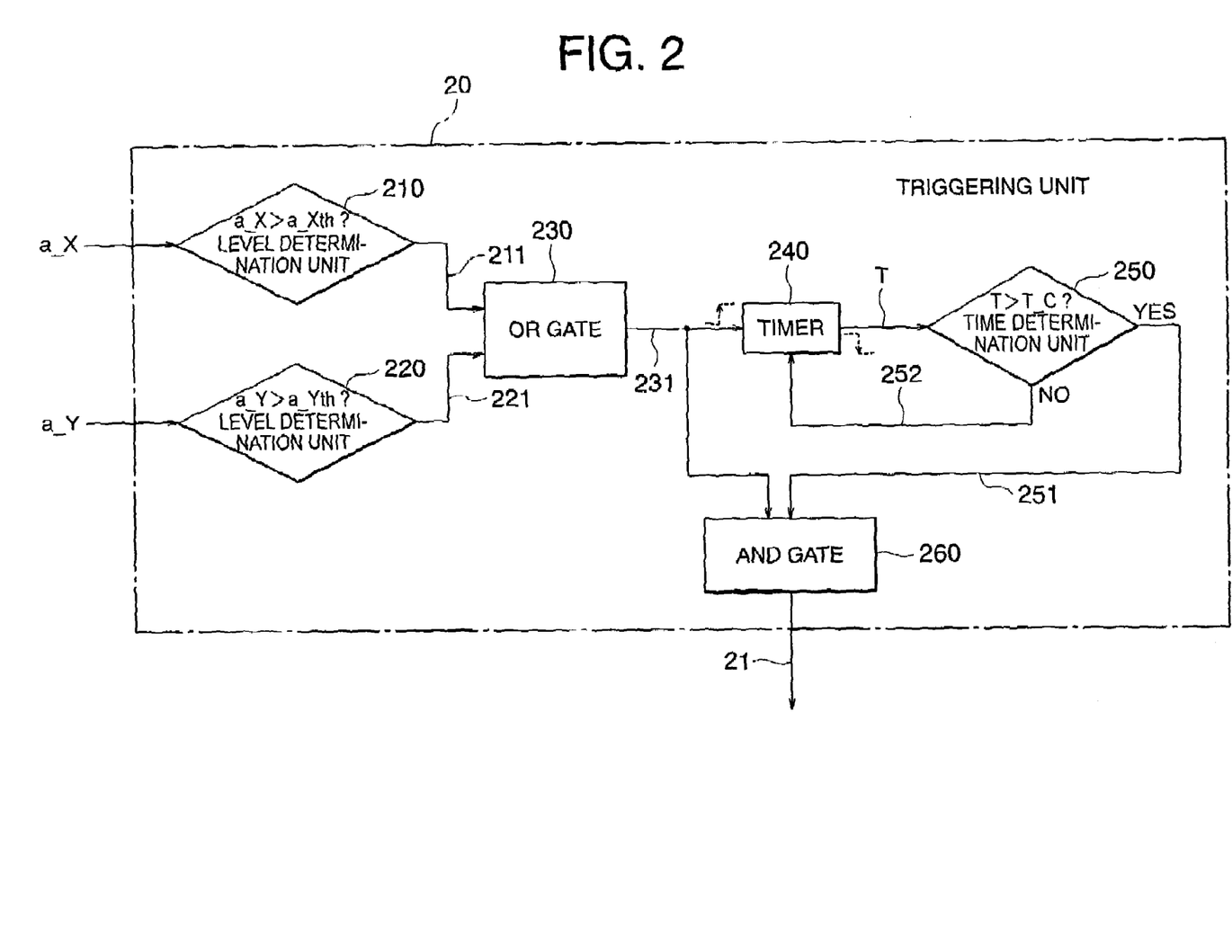
FIG. 2 is a block diagram showing a functional structure of a triggering unit in FIG. 1.

FIG. 2 is a block diagram of a triggering unit in the crash parameter determination apparatus according to the embodiment 1 of the present invention, showing part of the process of detecting a vehicle crash to start parameter calculations in a flowchart.

Figure 3:
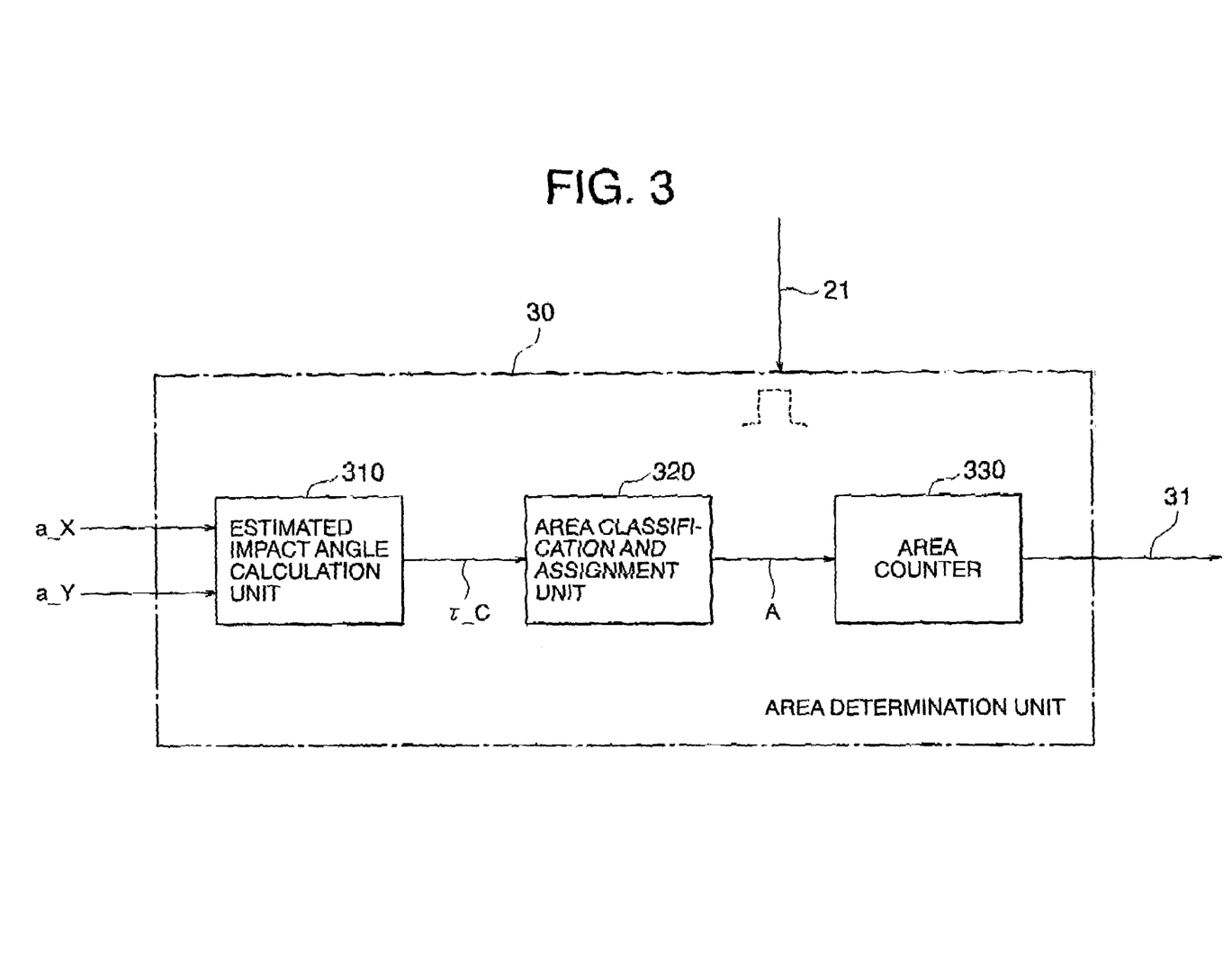
FIG. 3 is a block diagram of an area determination unit in FIG. 1, showing part of a functional structure in a flowchart.

FIG. 3 is a block diagram of an area determination unit in the crash parameter determination apparatus according to the embodiment 1 of the present invention, showing process blocks for roughly determining an impact location.

Figure 4:
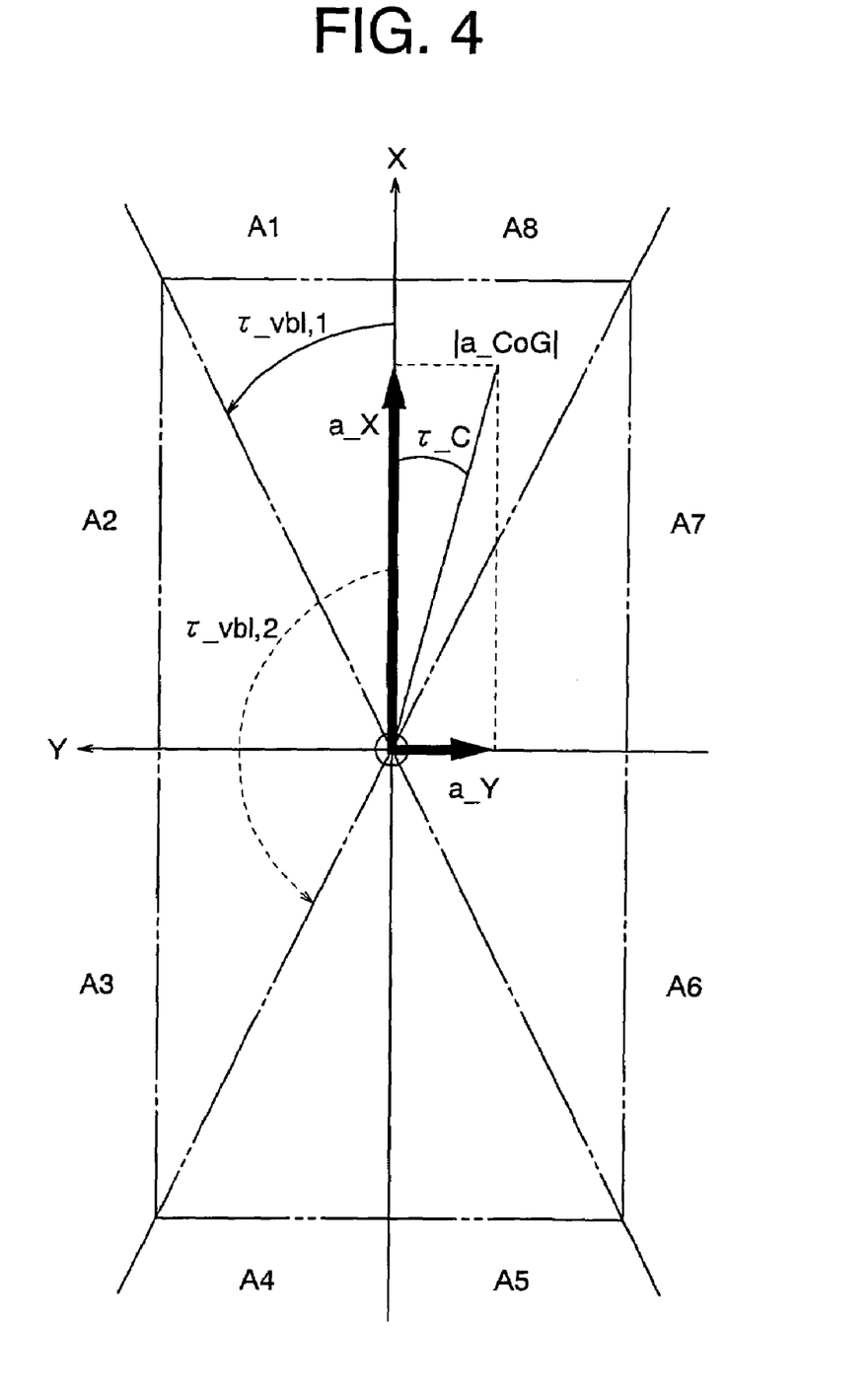
FIG. 4 is a drawing illustrating an estimated impact angle calculated by an estimated impact angle determination unit in FIG. 3 and vehicle areas.

FIG. 4 is a drawing illustrating an estimated impact angle calculated in the area determination unit shown in FIG. 3 and vehicle areas.

Figure 5:
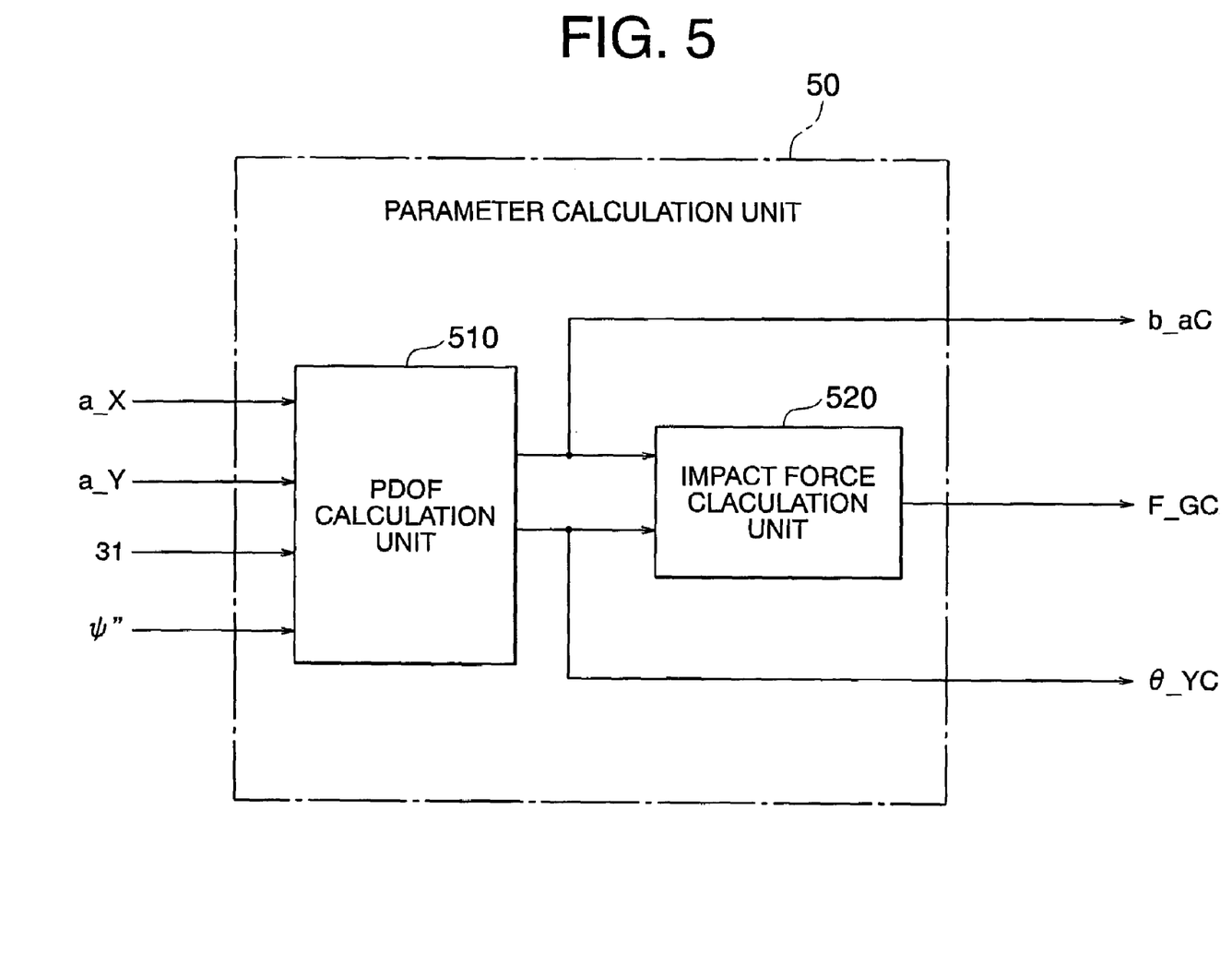
FIG. 5 is a block diagram showing a functional structure of a parameter calculation unit in FIG. 1.

FIG. 5 is a block diagram of a parameter calculation unit in the crash parameter determination apparatus according to the embodiment 1 of the present invention, showing the process of actually calculating the desired vehicle crash parameters.

Figure 6:
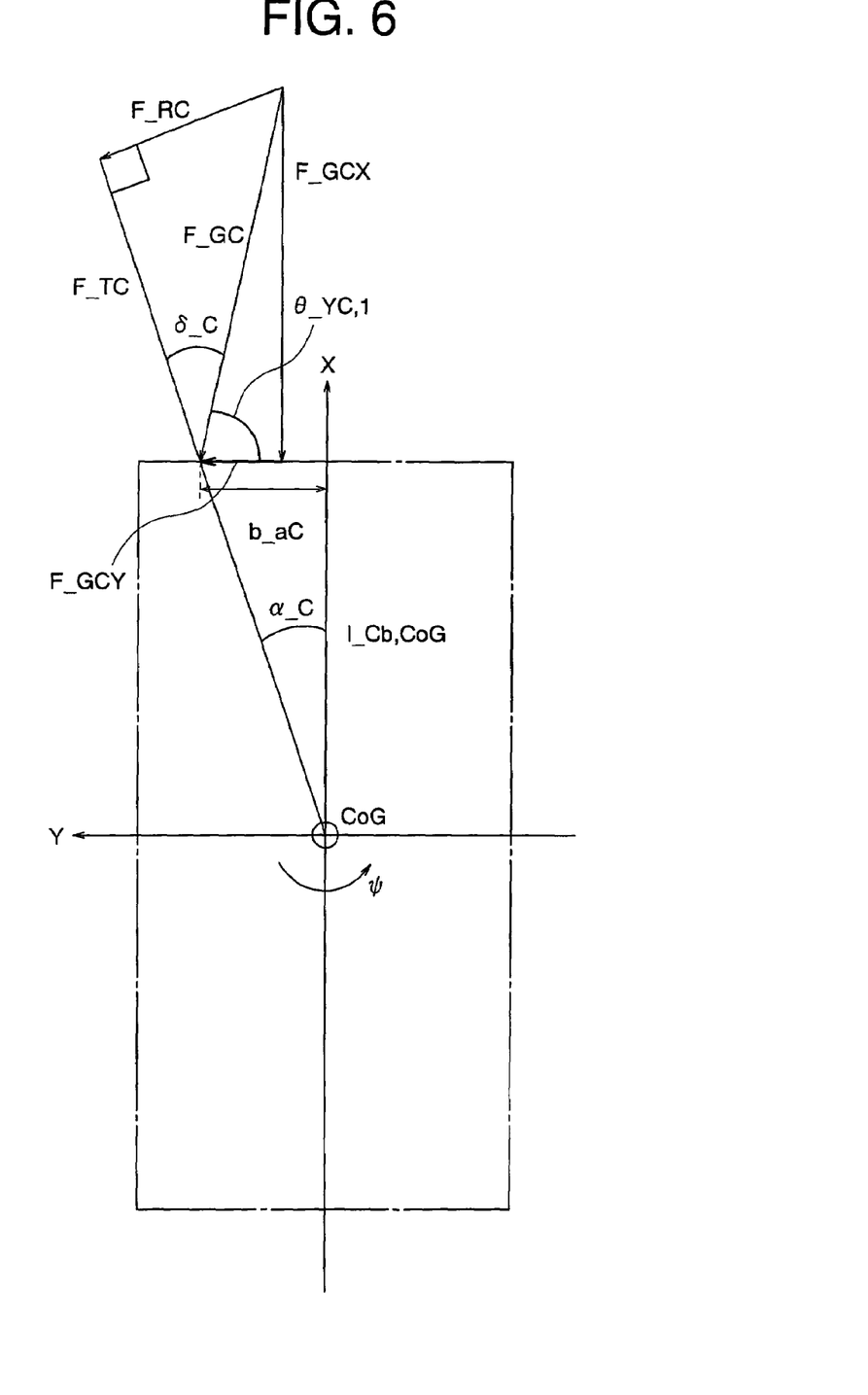
FIG. 6 is a drawing schematically showing forces and angles processed by a parameter determination unit according to the embodiment 1 of the present invention.

FIG. 6 is a drawing explaining the crash parameters (impact force and impact angle) processed by the parameter calculation unit shown in FIG. 5.

Figure 7:
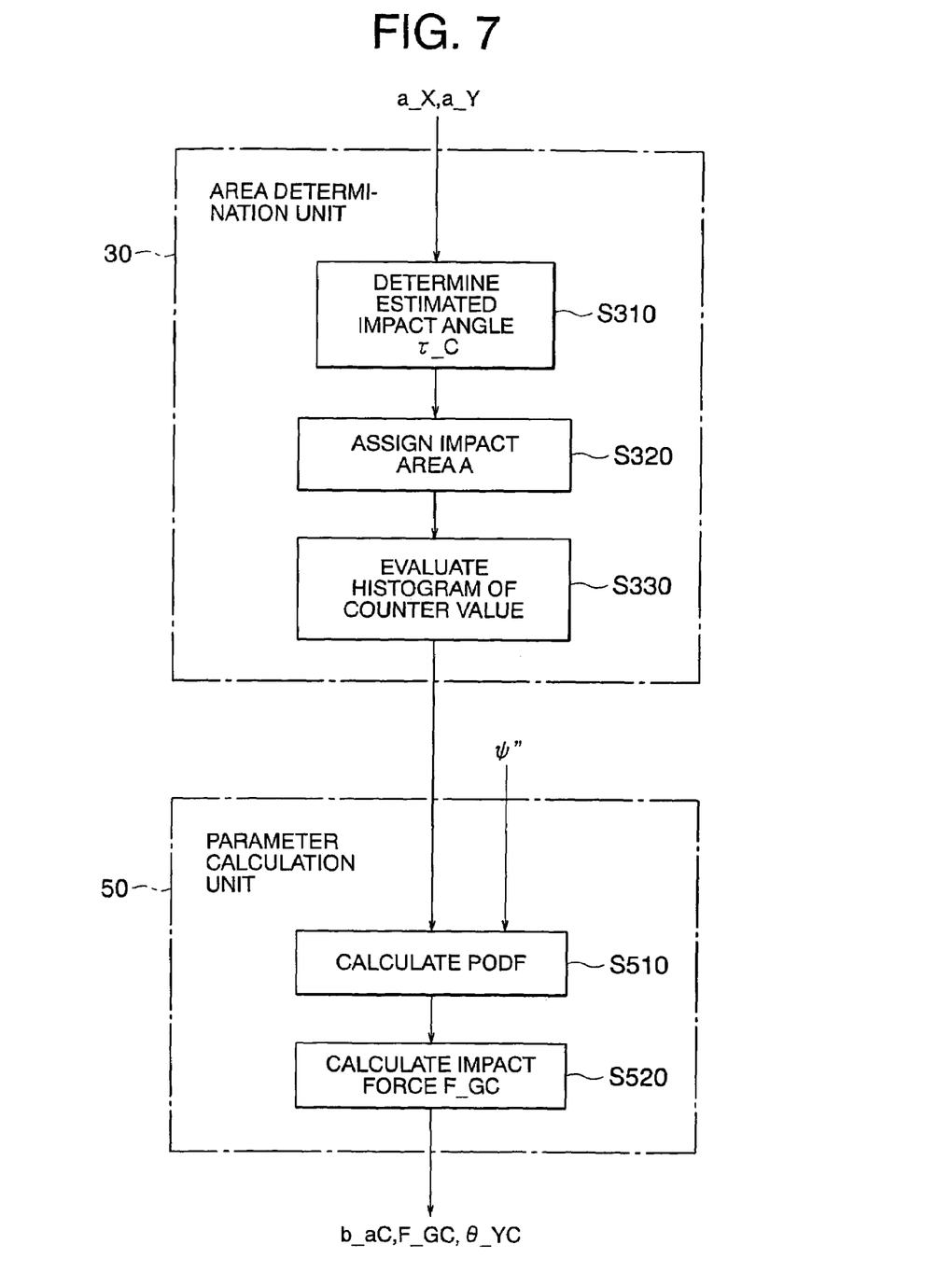
FIG. 7 is a flowchart schematically showing the processes of crash parameter calculation according to the embodiment 1 of the present invention.

FIG. 7 is a flowchart showing the processes of parameter calculation carried by the crash parameter determination apparatus according to the embodiment 1 of the present invention.

In FIG. 1, the crash parameter determination apparatus 10 mainly consists of three subunits, namely, a triggering unit 20, an area determination unit 30, and a parameter calculation unit 50, and additionally, a differentiation unit 40.

The crash parameter determination apparatus 10 uses these components 20 to 50 to determine vehicle crash parameters (impact location b_aC, impact force F_GC, and impact angle θ_YC) based on input signals (acceleration signals a_X, a_Y, yaw rate signal ψ') from sensors mounted in the vehicle (or a network) (not shown).

In the crash parameter determination apparatus 10, the triggering unit 20 generates a trigger signal 21 if the input signals (acceleration signals a_X, a_Y) indicate a vehicle crash situation to start the parameter calculation by the units which perform subsequent processes.

The trigger signal 21 enables processes of the area determination unit 30 and the parameter calculation unit 50 to be started.

The area determination unit 30 roughly determines the estimated impact location to reduce the amount of calculation by the parameter calculation unit 50 which calculates the crash parameters in the subsequent process.

In response to the trigger signal 21, the area determination unit 30 generates a most probable impact area 31 of the vehicle based on the input signals (acceleration signals a_X, a_Y).

The differentiation unit 40 is provided in an input circuit of the parameter calculation unit 50. The differentiation unit 40 differentiates the input signal (yaw rate signal ψ') to generate a yaw acceleration signal ψ", and inputs the yaw acceleration signal ψ" to the parameter calculation unit 50.

Finally, the parameter calculation unit 50 actually calculates the crash parameters (impact location b_aC, impact force F_GC, and impact angle θ_YC) based on the input signals (acceleration signals a_X, a_Y and yaw acceleration signal ψ") the most probable impact area 31, and outputs these parameters as the final desired vehicle crash parameters.

The acceleration sensors mounted in the vehicle generate the acceleration signals a_X, a_Y with respect to an X-axis direction (front-rear direction) and a Y-axis direction (lateral direction), and input these signals to the subunits 20, 30, 50 in the crash parameter determination apparatus 10.

Likewise, the yaw rate sensor in the vehicle generates the yaw rate signal ψ' with respect to a cornering direction of the vehicle, and inputs the signal into the differentiation unit 40 in the crash parameter determination apparatus 10.

The differentiation unit 40 differentiates the yaw rate signal ψ' to generate a yaw acceleration signal ψ", and inputs the signal into the parameter calculation unit 50.

The triggering unit 20 has determination units, a timer, and logical operators (described later) for detecting a crash event of the vehicle based on the acceleration signals a_X, a_Y, and generating a trigger signal 21 which triggers the subunits 30, 50 when the crash is detected.

That is, based on the levels of the acceleration signals a_X, a_Y and the duration time, the triggering unit 20 sets the trigger signal 21 to the H-level when the vehicle crash is detected, and starts the processes of the area determination unit 30 and the parameter calculation unit 50 in the crash parameter determination apparatus 10.

Specifically, the triggering unit 20 compares the levels of the acceleration signals a_X, a_Y and the duration time with predefined thresholds. Based on the logical operation of the comparison results, the triggering unit 20 generates the trigger signal 21, and inputs the trigger signal 21 into the area determination unit 30.

The area determination unit 30 has an area classification and assignment unit and an area counter (described later) which are triggered in response to the trigger signal 21 to reduce the amount of calculation in the process of determining the crash parameters by the parameter calculation unit 50.

The area classification and assignment unit in the area determination unit 30 determines the most probable impact location of the vehicle and classifies an impact area in every time instant (in every sampling step).

The area counter in the area determination unit 30 individually counts the impact area which has been classified in every time instant to detect the most probable impact area 31 to which the crash opponent's impact is applied, and inputs the most probable impact area 31 into the parameter calculation unit 50.

Based on the most probable impact area 31, the acceleration signals a_X, a_Y, and the yaw acceleration signal ψ", the parameter calculation unit 50 calculates the impact location b_aC of the vehicle, the impact force F_GC applied to the crash opponent, and the impact angle θ_YC based on the principle direction (described later) of the impact force F_GC applied to the impact location b_aC.

Next, general operation of the impact parameter determination apparatus 10 according to the embodiment 1 of the present invention shown 1 will be described.

In FIG. 1, firstly, when the triggering unit 20 detects a crash of the vehicle based on the acceleration signals a_X, a_Y, the triggering unit 20 inputs the trigger signal 21 which functions as a crash calculation enable flag into the area determination unit 30.

Thus, the area determination unit 30 is placed in a condition capable of executing the calculation process for determining the most probable impact area 31.

Thereafter, if the triggering unit 20 detects the end of the crash phase, the trigger signal 21 (crash calculation enable flag) is reset, and the processing of the algorithms in the area determination unit 30 is not further executed.

In response to the trigger signal 21, the area determination unit 30 processes the acceleration signals a_X, a_Y inputted from the acceleration sensors. The area determination unit 30 determines the most probable area 31 of impact to which the crash opponent's impact is applied.

The yaw rate signal ψ' inputted to the crash parameter determination apparatus 10 is differentiated with respect to time t by the differentiation unit 40, and the differentiated yaw rate signal ψ' is inputted to the parameter calculation unit 50 as the yaw acceleration signal ψ".

The parameter calculation unit 50 refines the most probable impact area 31 using the yaw acceleration signal ψ".

At this time, inside the parameter calculation unit 50, algorithms based on the laws of motion are executed.

The results of the algorithms executed in the parameter calculation unit 50 are outputted from the crash parameter determination apparatus 10 as the impact location (impact point) b_aC, the impact force (magnitude of the impact force) F_GC, and the impact angle θ_YC.

In FIG. 1, the subunits 20, 30, 50 are connected by arrows for illustrating the processing signals and the flow of the processing signals in the subunits 20, 30, 50 in the crash parameter determination apparatus 10.

In reality, the subunits 20, 30, 50 process the necessary inputs from registers and/or from an external memory (not shown) and save the (intermediate) calculation results in the registers and/or external memory addressed by one or more microprocessors (not shown).

Furthermore, the processes and algorithms of the crash parameter determination apparatus 10 are executed on a similar microprocessor.

FIG. 2 is a block diagram specifically showing a functional structure of the triggering unit 20 in FIG. 1.

In FIG. 2, the triggering unit 20 includes level determination units 210, 220 for determining the levels of the acceleration signals a_X, a_Y, an OR gate 230 for outputting a logical sum of the respective determination results of the level determination units 210, 220, a timer 240 triggered by the output signal of the OR gate 230, a time determination unit 250 for determining elapsed time using the timer 240, and an AND gate 260 for outputting a logical product of the output signals from the OR gate 230 and the time determination unit 250.

The level determination unit 210 determines whether the acceleration signal a_X in the front-rear direction of the vehicle exceeds a threshold a_Xth. If the level determination unit 210 determines that the acceleration signal a_X exceeds the threshold a_Xth (i.e., YES), the level determination unit 210 outputs an H-level determination result 211.

That is, if the acceleration (measured value) in the front-rear direction exceeds the threshold a_Xth, the determination result 211 is assigned "true (H-level)", and if the acceleration does not exceed the threshold a_Xth, the determination result 211 is assigned "false (L-level).

Likewise, the level determination unit 220 determines whether the acceleration signal a_Y in the lateral direction of the vehicle exceeds a threshold a_Yth. If the level determination unit 220 determines that the acceleration signal a_Y exceeds the threshold a_Yth (i.e., YES), the level determination unit 220 outputs an H level determination result 221.

That is, if the acceleration (measured value) in the lateral direction exceeds the threshold a_Yth, the determination result 221 is assigned "true (H-level)", and if the acceleration does not exceed the threshold a_Yth, the determination result 221 is assigned "false (L-level)".

As described above, both of the determination results 211, 221 are binary signals (0, 1), and inputted to the timer 240 and the AND gate (logical gate) 260 through the OR gate (logical gate) 230.

The OR gate 230 and the AND gate 260 are logical operators for combining the determination results 211, 221, 251 and 231 of the level determination units 210, 220, and the time determination unit 250 to generate the trigger signal 21.

The logical sum signal 231 outputted from the OR gate 230 is a binary signal which functions as an acceleration exceed flag. If at least one of the acceleration signals a_X, a_Y in the X and Y directions exceeds its threshold a_Xth, a_Yth, the logical sum signal 231 is "true (H-level)", and if both of acceleration signals a_X, a_Y do not exceed the respective thresholds a_Xth, a_Yth, the logical sum signal 231 is "false (L-level)".

The logic sum signal 231 of "true (H-level)" triggers the beginning of time counting by the timer 240, and the logical sum signal 231 of "false (L-level)" triggers the end of time counting by the timer 240.

The timer 240 outputs the lapsed time T (H-level duration time of the logic sum signal 231) from the beginning of the excessive acceleration (crash) to the end of the excessive acceleration (current time).

The time determination unit 250 compares the elapsed time T with a previously specified crash duration time T_C to determine whether the elapsed time T is longer than the crash duration time T_CT.

If the time determination unit 250 determines that T>T_CT (i.e., YES), the time determination unit 250 inputs an L-level determination result 251 (crash duration time flag) to the AND gate 260.

If the time determination unit 250 determines that T≦T_CT (i.e., NO), the time determination unit 250 inputs an H-level determination result 251 (crash duration time flag) to the AND gate 260.

That is, if the logical signal of the determination result 251 indicates T>T_CT, the determination result 251 is assigned "false(L-level)", and if the logical signal of the determination result 251 indicates that T≦T_CT, the determination result 251 is assigned "true (H-level)".

If the determination result 251 changes its state from the "true (H-level)" to the "false (L-level), the time determination unit 250 places the determination result 252 to the timer 240 in the H-level state for resetting the timer 240.

That is, the timer 240 is reset at the time when the elapsed time T exceeds the crash duration time T_CT.

If both states of the logic sum signal 231 (acceleration exceed flag) and the determination result 251 (crash duration time flag) indicate "true (H-level)", the AND gate 260 generates an H-level trigger signal 21.

That is, if at least one of the acceleration signals a_X, a_Y exceeds its threshold a_Xth, a_Yth, and the elapsed time T since the beginning of the crash is shorter than the crash duration time T_TC, the trigger signal 21 outputted form the triggering unit 20 is "true (H-level)".

If at least one of the exceed flag states of the acceleration signals a_X, a_Y, and the elapsed time T is not "true (H-level)", the trigger signal 21 outputted from the triggering unit 20 is "false (L-level)".

FIG. 3 is a block diagram showing a functional structure of the area determination unit 30 triggered by the trigger signal 21.

FIG. 4 is a view showing the relationship between the estimated impact angle τ_C calculated by the estimated impact angle calculation unit 310 in the area determination unit 30 and the impact area A (one of the vehicle areas A1 to A8) assigned by the area classification and assignment unit 320. FIG. 4 corresponds to a condition of the vehicle as viewed from the top. The X-axis direction is the front direction of the vehicle.

In FIG. 4, the central cross point (see a circle mark) represents the center of gravity CoG of the vehicle. The estimated impact angle τ_C is calculated by the combined absolute value |a_CoG| of the acceleration signals a_X, a_Y.

The angles τ_vbl, i (i=1, 2, 3, 4) of the first to fourth quadrants depend on the geometric measures of the vehicle.

In FIG. 3, the area determination unit 30 includes the estimated impact angle calculation unit 310, the area classification and assignment unit 320, and an area counter 330.

The estimated impact angle calculation unit 310 calculates the estimated impact angle τ_C based on the acceleration signals a_X, a_Y.

In every time instant, the area classification and assignment unit 320 determines the most probable impact location of the vehicle to classify the impact area, and one of the vehicle area A1 to A8 (see FIG. 4) is assigned by calculation.

The area counter 330 consists of individual 8 counters corresponding to the respective vehicle areas A1 to A8. Every time an assigned impact area A is inputted, the individual counter corresponding to one of the vehicle area A1 to A8 is incremented. At the end, the impact area having the maximum counter value is outputted as the most probable area 31.

As described above, the processes and algorithms in the area determination unit 30 are executed in response to the trigger signal 21 (crash calculation enable flag) which is a binary signal having the two states ("true", "false").

That is, the algorithms of the area determination unit 30 are executed if the trigger signal 21 is assigned "true (H-level)", and results of the processes are written in a memory.

If the trigger signal 21 is assigned "false (L-level)", the algorithms of the area determination unit 30 are not executed, and the area determination unit 30 is placed into the "sleep mode".

Next, the algorithm process of the area determination unit 30 when the trigger signal 21 is assigned "true" will be described in detail.

Firstly, in the estimated impact angle calculation unit 310, the two acceleration signals a_X/a_Y are compared in every sampling step. Using the acceleration signals a_X/a_Y (see FIG. 4), the estimated impact angle $\tau\_C$ is calculated by the following equation (1).

$$\tau\_C = \arctan(a\_Y/a\_X) \quad (1)$$

Then, the area classification and assignment unit 320 assigns the estimated impact angle $\tau\_C$ to one of the respective vehicle areas A1 to A8 (see FIG. 4) depending on the geometric measures of the vehicle.

As a result, the impact area A (one of the vehicle area A1 to A8) assigned in every sampling step by the combination of the acceleration signals a_X, a_Y is inputted to the area counter 330.

Namely, in every time instant, the area classification and assignment unit 320 classifies one impact area A, and increments its individual counter in the area counter 330 corresponding to the impact area A.

That means, in every sampling step, one of the eight counters in the area counter 330 is incremented.

Finally, the area counter 330 chooses the area with the highest counter value, and outputs it as the most probable impact area 31.

In this manner, when a crash is detected, the area determination unit 30 is capable of roughly determining the impact area with little computational complexity.

Further, this helps to decrease the calculation time required to determine the crash parameters in the parameter calculation unit 50.

Moreover, in the parameter calculation unit 50, the algorithms to determine crash parameters have to be executed only for three areas, i.e., the most probable impact area 31 and two vehicle areas adjacent to the most probable impact area 31 instead of the eight vehicle areas (A1 to A8) shown in FIG. 4.

FIG. 5 is a block diagram showing a functional structure of the parameter calculation unit 50 in FIG. 1.

Further, FIG. 6 is a drawing which explains the crash parameters (impact force F_GC and impact angle $\theta\_YC, 1$) processed by the parameter calculation unit 50.

In FIG. 6, F_GC is the impact force, F_GCX is the component of the impact force F_GC in the X-axis direction, and F_GCY is the component of the impact force F_GC in the Y-axis direction.

Further, F_TC is the transmission force to the center of gravity CoG, F_RC is the rotational force by the impact, and $\theta\_YC, 1$ is the impact angle in the vehicle area A1.

Further, $\alpha\_C$ is the angle defined by the X-axis (axis in the front-rear direction) and the transmission force F_TC toward the center of gravity CoG, $\delta\_C$ is the angle defined by the impact force F_GC and the transmission force F_TC toward the center of gravity CoG.

Moreover, b_aC is the distance from the X-axis (center of the impact surface) to the impact location, l_Cb is the distance from the center of gravity CoG to the front surface of the vehicle, and $\psi$ is the yaw angle.

In FIG. 5, the parameter calculation unit 50 includes a PDOF (principle direction of force) calculation unit 510 and an impact force calculation unit 520.

The PDOF calculation unit 510 in the parameter calculation unit 50 calculates the impact location b_aC and the impact angle $\theta\_YC$ based on the acceleration signals a_X, a_Y, the most probable impact area 31, and the yaw acceleration signal $\psi'$.

Further, the impact force calculation unit 520 calculates the impact force F_GC based on the impact location b_aC and the impact angle $\theta\_YC$.

The parameter calculation unit 50 refines the check areas including the most probable impact area 31 using the yaw acceleration signal $\psi''$.

Specifically, considering the yaw acceleration signal $\psi''$, the parameter calculation unit 50 checks the two areas adjacent to the most probable impact area 31 to consider rotational motion $\psi$ of the crash vehicle (see FIG. 6).

That means, based on the most probable impact area 31 determined by the area determination unit 30, the parameter calculation unit 50 investigates all in all three areas including the most probable impact area 31 using the algorithms based on the laws of motion.

Referring to FIG. 6, the impact force F_GC is divided into the components in the X (front-rear) direction and the Y (lateral) direction of the vehicle, and the following motion equations (2), (3) are considered.

$$m \cdot a\_X = -F\_GCX \quad (2)$$

$$m \cdot a\_Y = F\_GCY \quad (3)$$

In equations (2), (3), m denotes the vehicle mass.

Further, the torque balance around the yaw axis through the center of gravity CoG of the vehicle yields the following equation (4).

$$J\_Z \cdot \psi'' = b\_aC \cdot F\_GCX + l\_Cb, CoG \cdot F\_GCY \quad (4)$$

In equation (4), J_Z denotes the mass moment of inertia about the vertical vehicle axis.

The PDOF calculation unit 510 carries out geometric calculations using equations (2) to (4) to calculate the impact location b_aC and the impact angle $\theta\_YC, 1$.

Further, the impact force calculation unit 520 uses sets of input information (impact location b_aC and impact angle $\theta\_YC, 1$) provided from the PDOF calculation unit 510 to calculate the impact force F_GC.

As described above, the impact parameter determination apparatus 10 calculates the impact location b_aC, the impact force F_GC, and the impact angle $\theta\_YC, 1$ as the crash parameters.

Next, the calculation processes will be described step by step with reference to FIG. 7.

FIG. 7 shows the successive processing steps carried out to gain the vehicle crash parameters.

In FIG. 7, steps S310, S320, S330 are processes carried out by the area determination unit 30 corresponding to the processes of the estimated impact angle calculation unit 310, the area classification and assignment unit 320, and the area counter 330, respectively.

The steps S510, S520 are processes carried out by the parameter calculation unit 50 corresponding to the processes of the PDOF calculation unit 510 and the impact force calculation unit 520 in FIG. 5.

Firstly, the estimated impact angle calculation unit 310 processes the acceleration signals a_X, a_Y measured by the acceleration sensors mounted in the vehicle using the above equation (1) to calculate the estimated impact angle $\tau\_C$ (step S310).

Then, in every sampling step, the area classification and assignment unit 320 detects one of the vehicle areas A1 to A8 (see FIG. 4) corresponding to the calculated angle $\tau\_C$, and the detected area is assigned as the impact area A (step S320).

For example, if the calculated estimated impact angle $\tau\_C$ is between 0 and $\tau\_vb1, 1$, then the vehicle area A1 in FIG. 4 is selected as the classified impact area A (detection result).

Thus, in the area counter 330, the counter values of the individual counters assigned to the vehicle areas A1 to A8 are incremented corresponding to the impact area A inputted in every sampling step.

Then, histogram evaluation means in the area counter 330 evaluates the counter value in each of the vehicle areas A1 to A8. The histogram evaluation means rates the vehicle area with the highest counter value as the most probable impact area 31 (step S330).

Then, considering the relationship in FIG. 6, the PDOF calculation unit 510 in the parameter calculation unit 50 determines the principle direction of force $\alpha\_C$ using the acceleration signals a_X, a_Y, and the most probable impact area 31 obtained in step S330, and the yaw acceleration signal $\psi''$ obtained by differentiating the yaw rate signal $\psi'$ by the following equation (5) (step S510)

$$\alpha\_C = \arctan(a\_Y/a\_X - J\_Z\psi''/1\_Cb, CoG \cdot m \cdot a\_X) \quad (5)$$

The principle direction $\alpha\_C$ of the impact force is calculated by the parameter calculation unit 50 in the crash parameter determination apparatus 10 by the equation (5).

The principle direction $\alpha\_C$, the magnitudes and directions of other forces, and other angles are shown in FIG. 6.

Finally, the impact force calculation unit 520 calculates the impact force F_GC using the impact location b_aC and the impact angle $\theta\_YC$ calculated in step S510 (step S520), and outputs the impact force F_GC together with the impact location b_aC and the impact angle $\theta\_YC$ as the crash parameters.

At this time, the following calculation is carried out in step S520.

Firstly, the total impact force F_GC is determined by the following equation (6).

$$F\_CG = -m \cdot a\_X / \cos(\alpha\_C - \delta\_C) \quad (6)$$

Then, the following equation (7) is obtained using the equation (6).

$$a\_Y/a\_X = \tan(\alpha\_C - \delta\_C) \quad (7)$$

Combining the equations (5) and (7), the angle $\delta\_C$ defined by the total force F_GC and the transmission force F_TC is obtained by only using the acceleration signals a_X, a_Y, and the yaw acceleration signal $\psi''$ by the following equation (8).

$$\delta\_C = \alpha\_C - \arctan(a\_Y/a\_X) \quad (8)$$

Then, the impact angle $\theta\_YC, 1$ is calculated by the following equation (9).

$$\theta\_YC, 1 = \pi/2 + \arctan(a\_Y/a\_X) \quad (9)$$

Finally, the total force F_GC is calculated by using sole sensor information by the following equation (10).

$$F\_GC = -m \cdot a\_X / \sin \theta\_YC, 1 \quad (10)$$

As described above, in the crash parameter determination apparatus 10 according to the embodiment 1 of the present invention, in the trigger unit 20, the timer 240 is operated if the levels of the sensor signals exceed the thresholds, and the logical operators 230, 260 for suitably combining the timer information and the input signal information are used to generate the appropriate trigger signal 21 to start the subsystems 30, 50 at the time the crash is detected.

In the area determination unit 30 triggered by the trigger signal 21, the estimated impact angle calculation unit 310 calculates the most probable estimated impact angle $\tau\_C$ in every time instant, and the area classification and assignment unit 320 classifies the impact area A in every time instant, and the area counter 330 detects the most probable impact area 31 to reduce the amount of calculation in the crash parameter determination process.

Further, in the parameter calculation unit 50, the PDOF calculation unit 510 calculates the principle direction $\alpha\_C$ of force, and the impact force calculation unit 520 calculates the crash opponent's impact force F_G for determining the effective crash parameters with the reduced calculation amount.

That is, it is possible to determine not only the impact location b_aC with the crash opponent but also the direction of impact at the time of crash as the impact angle $\theta\_YC$.

Further, by determining the principle direction $\alpha\_C$ of force applied to the impact location b_aC, it is possible to reconstruct the basic passenger motion inside the passenger cab.

Thus, it is possible to provide valuable information to assess for instance out-of-position deployment of airbags at low velocities.

That means, it is possible to provide more information about such accident situations that often occur and which cause significant human and financial damage.

Namely, in order to determine crash parameters at low velocities, the detection data from the sensors on the vehicle is used for determining the impact location b_aC, the impact angle $\theta\_YC$, and the impact force F_GC, and the impact event and the impact duration time are determined by the triggering unit 20.

The calculations are separated into two steps. First, the most probable impact area 31 is determined using acceleration signals a_X, a_Y only. Then, the yaw acceleration signal $\psi''$ is added to the input information to calculate the crash parameters b_aC, F_GC, and $\theta\_YC$, to improve reconstruction quality of low speed crashes.

According to the embodiment 1, in the determination units 210, 220, 250 in the triggering unit 20, the determination result of "true" is set as the "H-level" to input the determination result to the high active logical operator. Alternatively, the determination result of "true" may be set as the "L-level" to input the determination result to the low active logical operator.

What is claimed is:

1. A vehicle accident analyzing apparatus comprising a crash parameter determination apparatus for determining crash parameters of a vehicle based on input signals from sensors mounted in the vehicle, the crash parameter determination apparatus comprising:

a triggering unit for generating a trigger signal if the input signals indicate a crash situation of the vehicle;

an area determination unit for generating a most probable impact area of the vehicle based on the input signals in response to the trigger signal; and a parameter calculation unit for calculating the crash parameters based on the input signals and the most probable impact area, the triggering unit comprising:

a level determination unit for determining levels of the input signals with predefined thresholds;

a timer operated in response to a determination result of the level determination unit;

a time determination unit for comparing operating time of the timer with predetermined duration time; and logical operators for generating the trigger signal by combining respective determination results of the level determination unit and the time determination unit, wherein the trigger signal enables processes of the area determination unit and the parameter calculation unit to be started;

the area determination unit comprises an area classification and assignment unit and an area counter triggered by the trigger signal;

the area classification and assignment unit determines the most probable impact location of the vehicle to classify the impact area in every time instant;

the area counter detects the most probable impact area by individually counting the impact area which has been classified in every time instant by the area classification and assignment unit; and the parameter calculation unit calculates an impact location of the vehicle and an impact force of a crash opponent, and calculates an impact angle based on a principle direction of the impact force applied to the impact location.

2. The vehicle accident analyzing apparatus according to claim 1, wherein the input signals inputted to the triggering unit and the area determination unit comprise respective acceleration signals in a front-rear direction and a lateral direction of the vehicle; and the input signals inputted to the parameter calculation unit comprise the respective acceleration signals and yaw acceleration.

3. The vehicle accident analyzing apparatus according to claim 2, wherein the level determination unit comprises first and second level determination units for comparing the respective acceleration signals in the front-rear direction and the lateral direction of the vehicle with individual thresholds, respectively;

the first and second level determination units output first determination results, respectively, if the respective acceleration signals exceed the individual thresholds, and output second determination results, respectively, if the respective acceleration signals do not exceed the individual thresholds; and the logical operators comprise an OR gate for outputting a logical sum of the first determination results of the first and second level determination units and an AND gate for outputting a logical product of the logical sum signal from the OR gate and the first determination result of the time determination unit as the trigger signal.

4. The vehicle accident analyzing apparatus according to claim 2, wherein the area determination unit comprises an estimated impact angle calculation unit for calculating an estimated impact angle of the vehicle based on the respective acceleration signals in the front-rear direction and the lateral direction of the vehicle;

the area classification and assignment unit determines the most probable impact location based on the estimated impact angle to classify the impact area; and the area counter comprises an individual counter for every vehicle area corresponding to the impact area, increments the individual counter corresponding to the impact area inputted from the area classification and assignment unit in every time instant, and outputs the vehicle area corresponding to the individual counter indicating the maximum counter value as the most probable impact area.

5. The vehicle accident analyzing apparatus according to claim 2, wherein the parameter calculation unit comprises a PDOF calculation unit and an impact force calculation unit;

the PDOF calculation unit calculates the impact location and the impact angle based on the respective acceleration signals in the front-rear direction and the lateral direction of the vehicle, the yaw acceleration, and the most probable impact area determined by the area determination unit; and the impact force calculation unit calculates the impact force based on the impact location and the impact angle.

6. The vehicle accident analyzing apparatus according to claim 1, wherein the parameter calculation unit executes an algorithm for determining the crash parameters to the most probable impact area and two vehicle areas adjacent to the most probable impact area.

* * * * *